(12) United States Patent
Zhang et al.

(10) Patent No.: US 10,698,579 B2
(45) Date of Patent: Jun. 30, 2020

(54) METHOD, DEVICE FOR DISPLAYING REFERENCE CONTENT AND STORAGE MEDIUM THEREOF

(71) Applicant: TENCENT TECHNOLOGY (SHENZHEN) COMPANY LIMITED, Shenzhen, Guangdong (CN)

(72) Inventors: Kunjie Zhang, Shenzhen (CN); Danning Wang, Shenzhen (CN); Jing Le, Shenzhen (CN); Shenping Xiong, Shenzhen (CN); Le Wang, Shenzhen (CN); Si Wu, Shenzhen (CN); Siquan Chen, Shenzhen (CN)

(73) Assignee: Tencent Technology (Shenzhen) Company Limited, Shenzhen, Guangdong (CN)

( * ) Notice: Subject to any disclaimer, the term of this patent is extended or adjusted under 35 U.S.C. 154(b) by 192 days.

(21) Appl. No.: 15/673,023

(22) Filed: Aug. 9, 2017

(65) Prior Publication Data

US 2017/0336935 A1    Nov. 23, 2017

Related U.S. Application Data

(63) Continuation of application No. PCT/CN2016/079173, filed on Apr. 13, 2016.

(30) Foreign Application Priority Data

May 25, 2015   (CN) .......................... 2015 1 0271011

(51) Int. Cl.
*G06F 3/0484*     (2013.01)
*G06F 3/0481*     (2013.01)
(Continued)

(52) U.S. Cl.
CPC .......... *G06F 3/0484* (2013.01); *G06F 3/0481* (2013.01); *G06F 3/04815* (2013.01);
(Continued)

(58) Field of Classification Search
CPC ...... G06F 3/0484; G06Q 50/12; G06Q 50/28; G06Q 50/30; G06Q 50/06
See application file for complete search history.

(56) References Cited

U.S. PATENT DOCUMENTS

| 6,670,970 B1 * | 12/2003 | Bonura | ................. G06F 3/0481 715/768 |
| 2004/0056899 A1 * | 3/2004 | Sinclair, II | ................ G06T 3/40 715/800 |

(Continued)

FOREIGN PATENT DOCUMENTS

| CN | 102469034 A | 5/2012 |
| CN | 103634455 A | 3/2014 |

(Continued)

OTHER PUBLICATIONS

International Search Report with Translation dated Jul. 13, 2016 for International Application No. PCT/CN2016/079173.

*Primary Examiner* — Olga V Merkoulova
(74) *Attorney, Agent, or Firm* — Brinks Gilson & Lione (57) ABSTRACT

A method and device for displaying reference content, and a storage medium thereof are provided. In some embodiments, the method includes displaying a first interface in response to an operation of enabling the first interface; displaying multiple second interfaces on the first interface in a form of floating window in response to an operation of enabling reference content, the multiple second interfaces including different reference content respectively; and displaying, in response to an operation of selecting a second interface from the multiple second interfaces, the selected second interface on the first interface in an overlaying
(Continued)

manner. The formation arranging efficiency and communication efficiency between game players and the reference content can be improved by the above technical solution.

20 Claims, 5 Drawing Sheets (51) Int. Cl.
*H04N 21/431* (2011.01)
*H04N 21/478* (2011.01)
(52) U.S. Cl.
CPC ..... *G06F 3/04842* (2013.01); *H04N 21/4314* (2013.01); *G06F 2203/04804* (2013.01); *G06F 2203/04806* (2013.01); *H04N 21/4316* (2013.01); *H04N 21/4781* (2013.01)

(56) References Cited

U.S. PATENT DOCUMENTS

| | | | | |
|---|---|---|---|---|
| 2009/0100374 | A1* | 4/2009 | Sheasby | G06F 3/0481 715/788 |
| 2010/0121658 | A1* | 5/2010 | Kaminski | A61C 19/00 705/3 |
| 2010/0211693 | A1* | 8/2010 | Master | G10L 25/51 709/238 |
| 2010/0245584 | A1* | 9/2010 | Minasyan | G08B 13/19652 348/159 |
| 2011/0098056 | A1* | 4/2011 | Rhoads | G01C 21/20 455/456.1 |
| 2011/0131235 | A1* | 6/2011 | Petrou | G06F 16/532 707/769 |
| 2012/0005607 | A1* | 1/2012 | Tofinetti | G06F 3/0481 715/769 |
| 2013/0113716 | A1* | 5/2013 | Williams | G06F 3/0488 345/173 |
| 2013/0328926 | A1* | 12/2013 | Kim | H04N 5/23293 345/633 |
| 2014/0189539 | A1* | 7/2014 | St. Clair | G06F 3/048 715/753 |
| 2014/0229817 | A1* | 8/2014 | Afram | G06F 40/166 715/230 |
| 2014/0337733 | A1* | 11/2014 | Rodriguez | G06F 3/04842 715/718 |
| 2015/0067573 | A1* | 3/2015 | Seo | G06F 3/04886 715/773 |

FOREIGN PATENT DOCUMENTS

| | | |
|---|---|---|
| CN | 103870093 A | 6/2014 |
| CN | 103957447 A | 7/2014 |
| CN | 104024983 A | 9/2014 |
| CN | 104123078 A | 10/2014 |
| CN | 104267871 A | 1/2015 |
| CN | 104808907 A | 7/2015 |
| CN | 104820541 A | 8/2015 |

* cited by examiner

METHOD, DEVICE FOR DISPLAYING REFERENCE CONTENT AND STORAGE MEDIUM THEREOF

CROSS REFERENCE TO RELATED APPLICATION

The present application is a continuation of International Application No. PCT/CN2016/079173, filed on Apr. 13, 2016, which claims the priority to Chinese Patent Application No. 201510271011.8, titled "METHOD AND DEVICE FOR DISPLAYING REFERENCE CONTENT", filed on May 25, 2015 with the State Intellectual Property Office of the People's Republic of China, both of which are incorporated herein by reference in entirety.

TECHNICAL FIELD

The present disclosure relates to the field of computer technology, and in particular to a method and a device for displaying reference content and a storage medium therefor.

BACKGROUND

With the popularity of the Internet and the intelligence of a mobile phone, more and more people like to play game, and games are becoming more and more varied. Formation arranging games become more and more popular with game players. Types of the formation arranging games are too numerous to enumerate, from corps confrontation to castle defense. For example, among others, Killer of the Three Kingdoms has become popular with a lot of game players.

The most important part of the formation arranging games is to arrange a formation, for example, how to build fortifications, or where to arrange cannons. A game player can arrange defense completely based on his own experience in arranging a formation. However, not all game players know how to arrange a formation, and most of game players need to refer to formation arranging templates.

SUMMARY

A method and a device for displaying reference content and a storage medium therefor are provided according to embodiments of the present disclosure.

In an aspect, a method for displaying reference content is provided according to the present disclosure. The method includes displaying a first interface in response to an operation of enabling the first interface. The method further includes displaying multiple second interfaces on the first interface in a form of floating window in response to an operation of enabling reference content. The multiple second interfaces respectively include different reference contents. The method further includes displaying, in response to an operation of selecting a second interface from the multiple second interfaces, the selected second interface on the first interface in an overlaying manner.

In another aspect, a device for displaying reference content is provided according to the present disclosure. The device includes one or more processors and a storage medium having operating instructions stored therein. The operating instructions in the storage medium when being executed cause the one or more processors to perform operations including displaying a first interface in response to an operation of enabling the first interface. The operations further include displaying multiple second interfaces on the first interface in a form of floating window in response to an operation of enabling reference content. The multiple second interfaces respectively include different reference contents. The operations further include displaying, in response to an operation of selecting a second interface from the multiple second interfaces, the selected second interface on the first interface in an overlaying manner.

In another aspect, a non-transient computer readable storage medium is provided according to the present disclosure. The storage medium has computer executable instructions stored therein, and the computer executable instructions when being executed in a computer cause the computer to perform operations including displaying a first interface in response to an operation of enabling the first interface. The operations further include displaying multiple second interfaces on the first interface in a form of floating window in response to an operation of enabling reference content. The multiple second interfaces respectively include different reference contents. The operations further include displaying, in response to an operation of selecting a second interface from the multiple second interfaces, the selected second interface on the first interface in an overlaying manner.

In the conventional technology, it is necessary to switch between a formation template interface and a formation scene interface to arrange a formation by imitating a template, which results in the low efficiency of arranging a formation and reduces the communication efficiency between a game player and reference content. Compared with the conventional technology, the method for displaying reference content according to some embodiments of the present disclosure can improve the efficiency of arranging a formation and the communication efficiency between a game player and the reference content.

DETAILED DESCRIPTION OF THE EMBODIMENTS

A method and a device for displaying reference content are provided according to embodiments of the present disclosure, which are respectively described below in detail.

Technical solutions of the embodiments of the present disclosure are illustrated clearly and completely in conjunction with the drawings of the embodiments of the present disclosure. Apparently, the described embodiments are merely a few rather than all of the embodiments of the present disclosure. All other embodiments obtained by those skilled in the art based on the embodiments of the present disclosure shall fall within the protection scope of the present disclosure.

Figure 1:
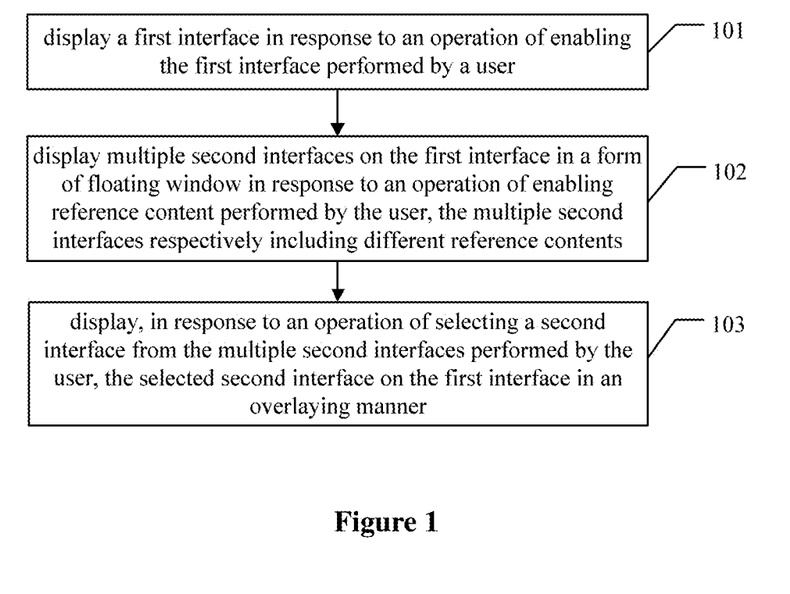
FIG. 1 is a schematic flow chart of a method for displaying reference content according to an embodiment of the present disclosure.

FIG. 1 is a schematic flow chart of a method for displaying reference content according to an embodiment of the present disclosure. The method may be applied to a terminal device, such as a mobile phone, or a computer. The method for displaying reference content according to an embodiment of the present disclosure includes steps 101 to 103.

In step 101, a first interface is displayed in response to an operation of enabling the first interface performed by a user.

The method for displaying reference content according to the embodiment of the present disclosure may be applied to strategy games, such as formation arranging games in the strategy games.

The strategy game refers to a game in which fighting goes on via a series of preparations, such as building fortifications, and arranging defense.

A first interface in the embodiment of the present disclosure may be a formation arranging interface in the formation arranging game. If an operation of enabling the formation arranging interface is inputted, the formation arranging interface is displayed.

The first interface in the embodiment of the present disclosure is not limited to the formation arranging interface, and may be an interface to be modified with reference to other interfaces.

Figure 2:
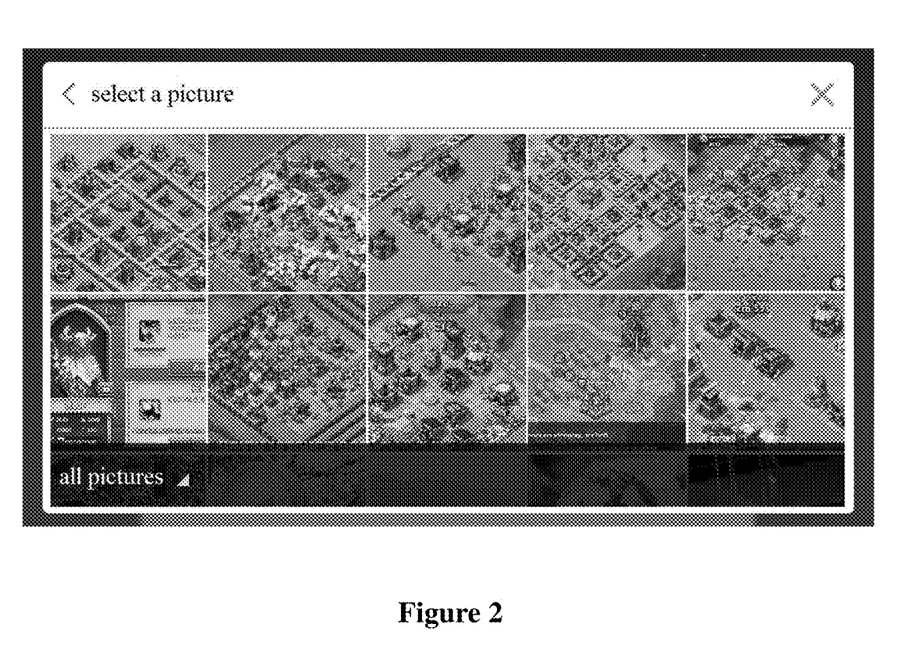
FIG. 2 is a schematic diagram of an example scenario of a method for displaying reference content according to an embodiment of the present disclosure.

As shown in FIG. 2, a user may select a formation picture from FIG. 2 and arrange a formation on the basis of the infrastructure provided by the formation picture.

In step 102, multiple second interfaces are displayed on the first interface in a form of floating window in response to an operation of enabling reference content performed by the user. The multiple second interfaces respectively include different reference contents.

If the embodiment of the present disclosure is applied to a formation arranging game, the reference content may be content in a formation template, including fortification design, positions of artillery and personnel arrangement. The second interface in a formation arranging scenario is a formation template interface. In different scenarios, the second interface may be a template interface or an interface including the reference content.

Figure 3:
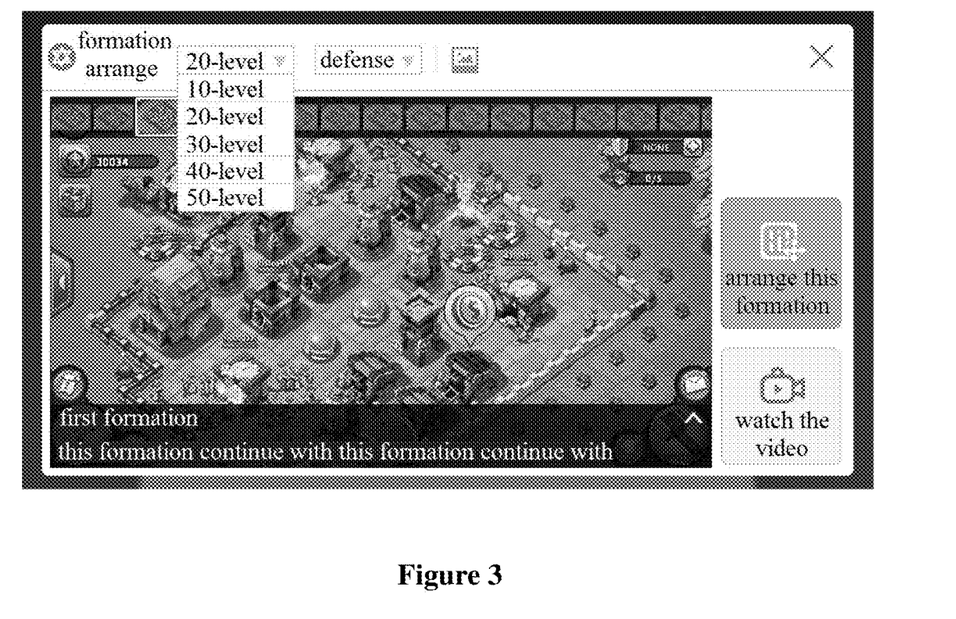
FIG. 3 is a schematic diagram of an example scenario of a method for displaying reference content according to another embodiment of the present disclosure.
Figure 4:
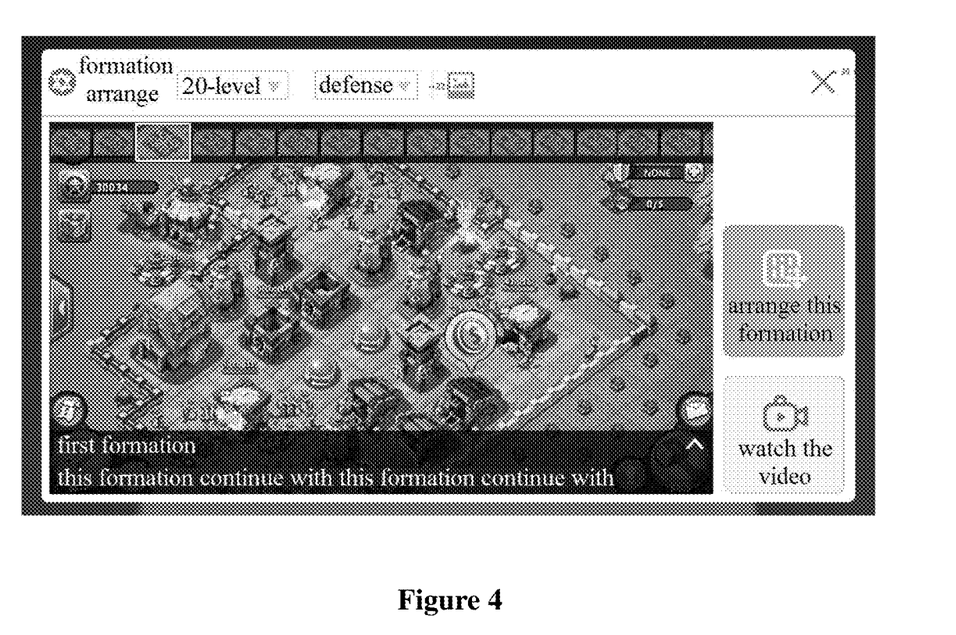
FIG. 4 is a schematic diagram of an example scenario of a method for displaying reference content according to another embodiment of the present disclosure.

As shown in FIG. 3, a level may refer to a game level, such as a level of the formation. The formation may include a defensive-type formation or an offensive-type formation. As shown in FIG. 4, if the 20-level and a defensive role are selected, the level (20-level) and multiple second interfaces (the formation arranging templates) of the defensive role are displayed on the first interface (the formation arranging interface). Those formation arranging templates are floated on the formation arranging interface in a form of floating window.

To meet user's browsing habits from top to bottom and from left to right, a screening frame may be arranged at the upper left corner of a display interface. As the level is a relatively fixed screening condition, the level may be arranged on the left of the formation. The advantages of arranging two screening items in a large frame are that the two screening items can be selected simultaneously and user operations are decreased, since an interface of a mobile terminal is small and the conventional drop-down frame is not easy to click. The position of the screening frame can also be arranged at other positions on the interface, which is not limited herein.

The second interface is floated directly on the first interface in a form of floating window, which is convenient for the user to determine a suitable template based on the contents of the first interface.

In step 103, in response to an operation of selecting a second interface from the multiple second interfaces, the selected second interface is displayed on the first interface in an overlaying manner.

Figure 5:
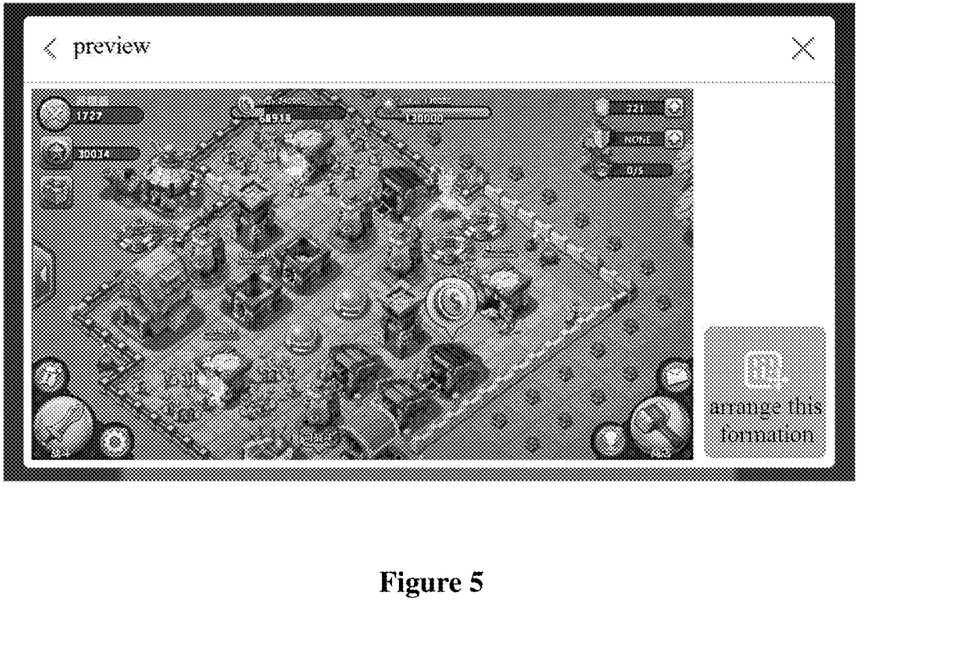
FIG. 5 is a schematic diagram of an example scenario of a method for displaying reference content according to another embodiment of the present disclosure.
Figure 6:
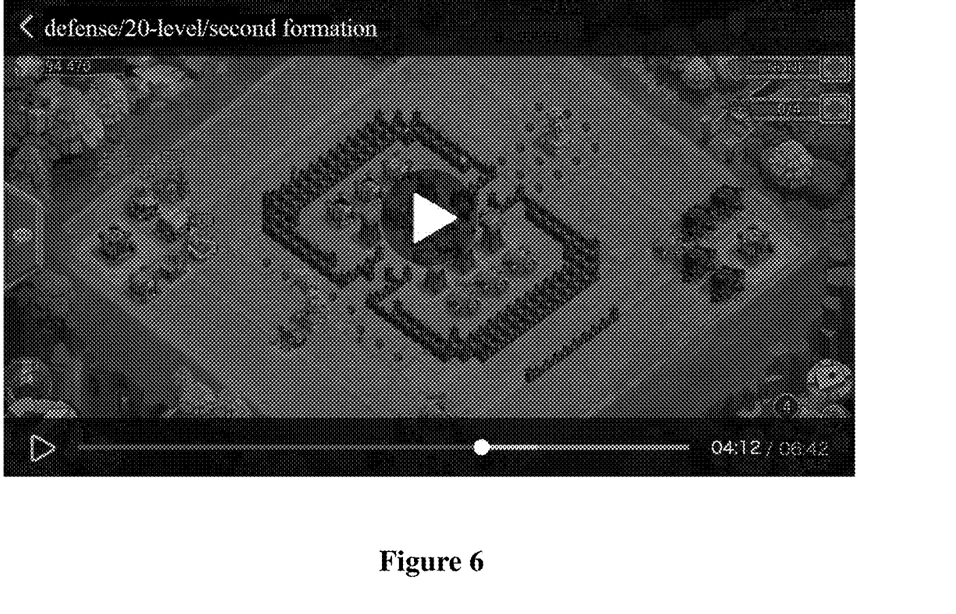
FIG. 6 is a schematic diagram of an example scenario of a method for displaying reference content according to another embodiment of the present disclosure.

The selected second interface is one of the multiple second interfaces which is clicked by the user. When the user clicks one of the multiple second interfaces, a preview of the clicked second interface will be displayed, as shown in FIG. 5. The user may view more details according to the preview, so as to determine whether it is the reference content that the user wants or not. In a case that it is not the suitable reference content, the user may continue to browse other second interfaces in a form of floating window, so as to view other reference content. In a case that it is the suitable reference content, a video on the selected second interface is watched, as shown in FIG. 6, and the video includes how to use the reference content, such as how to design fortifications, and how to set an ambush, which are of great help to new players.

Figure 7:
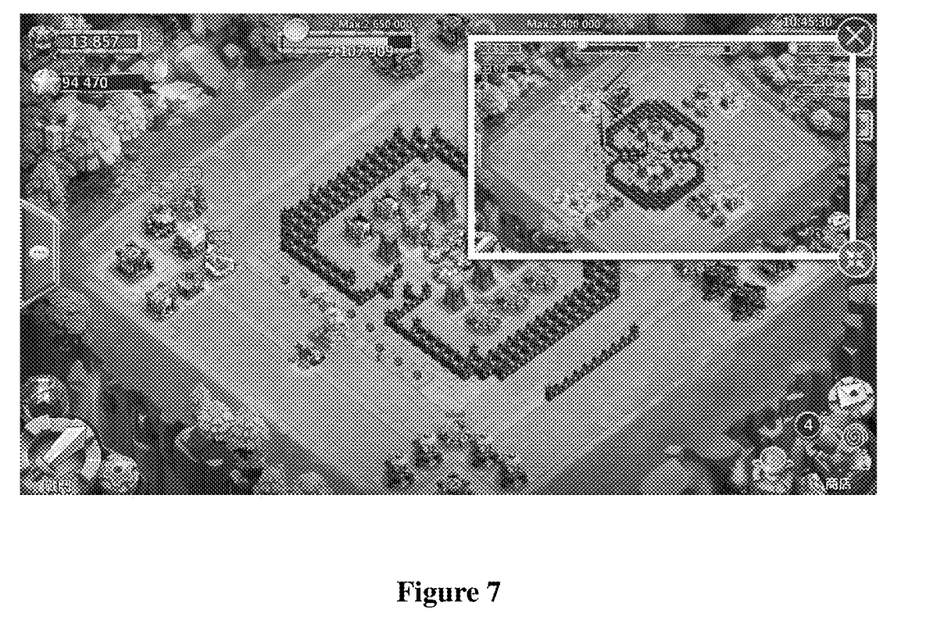
FIG. 7 is a schematic diagram of an example scenario of a method for displaying reference content according to another embodiment of the present disclosure.

After watching the video, the selected second interface can be displayed on the first interface in an overlaying manner, as shown in FIG. 7. The second interface is displayed on the first interface in an overlaying manner.

The embodiment of the present disclosure is not limited to displaying the selected second interface in an overlaying manner only after previewing the second interface and watching the selected second interface, and may also be directly displaying the selected second interface in an overlaying manner after the user clicks one of the second interfaces.

In the conventional technology, it is necessary to switch between a formation template interface and a formation scene interface to arrange a formation by imitating a template, which results in the low efficiency of arranging a formation and reduces the communication efficiency between a game player and reference content. Compared with the conventional technology, the method for displaying reference content according to the embodiment of the present disclosure can improve the efficiency of arranging a formation and the communication efficiency between a game player and the reference content.

Optionally, in an optional embodiment of the method for displaying reference content according to the embodiment of the present disclosure, on the basis of the above embodiment corresponding to FIG. 1, the displaying the selected second interface on the first interface in an overlaying manner may include displaying the selected second interface on the first interface in a floating manner, if the reference content included in the selected second interface is transparent or translucent. The area of the selected second interface is over a half of the area of the first interface.

In an embodiment of the present disclosure, if the reference content of the second interface is transparent or translucent, the second interface can be floated on the first interface without influencing the effect of the user viewing the first interface through the second interface. In this manner, the area of the second interface can be enlarged, which is convenient for viewing details.

Optionally, in an optional embodiment of the method for displaying reference content according to the embodiments of the present disclosure, on the basis of the above embodiment corresponding to FIG. 1, the displaying the selected second interface on the first interface in an overlaying manner may include displaying the selected second interface at a preset position on the first interface in an overlaying manner in a preset size.

As shown in FIG. 7, a second interface of the preset size may be displayed at the top right corner of the first interface. In arranging a formation, the second interface may be placed according to the interface arrangement of the first interface. For example, if the top right corner of the first interface is idle, the second interface may be placed at the top right corner of the first interface. In addition, in order to facilitate the finger to comfortably zoom in and out the formation picture, the height of the entire frame may be not smaller than three times of that of a minimum operating area of the finger.

Optionally, in an optional embodiment of the method for displaying reference content according to the embodiments of the present disclosure, on the basis of the above embodiment corresponding to FIG. 1, the method for displaying reference content may further include, if the selected second interface includes multiple function operation buttons, processing, in response to any function operation performed via the function operation button, the selected second interface in a manner corresponding to the function operation.

In an embodiment of the present disclosure, the second interface may include multiple function operation buttons, such as for zooming in, zooming out, or closing. When a user triggers any one of the buttons, the corresponding function will be executed, and the second interface will be zoomed in, or zoomed out, or closed.

Optionally, in another optional embodiment of the method for displaying reference content according to the embodiments of the present disclosure, on the basis of the above embodiment corresponding to FIG. 1, the displaying, in response to an operation of selecting a second interface from the multiple second interfaces performed by the user, the selected second interface on the first interface in an overlaying manner may include displaying, in response to an operation of selecting a second interface from the multiple second interfaces performed by the user, a video about the reference content on the selected operation interface, with the video about the reference content including dynamic descriptive information about the reference content, and displaying the selected second interface on the first interface in an overlaying manner in response to an operation of affirming the selected operation interface performed by the user.

The embodiments of the present disclosure can be understood with reference to FIG. 6 and FIG. 7.

Figure 8:
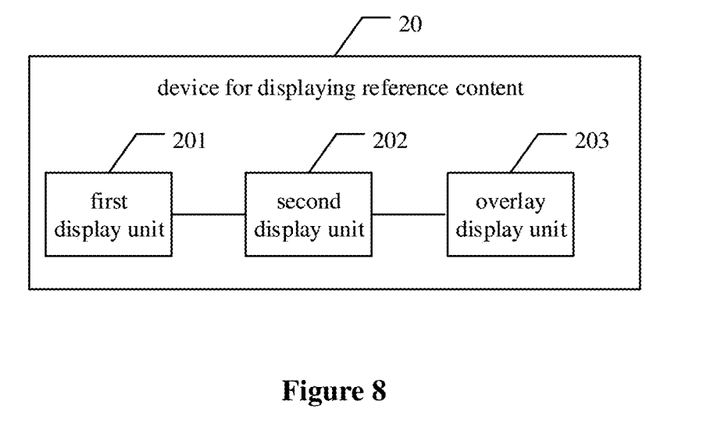
FIG. 8 is a schematic structural diagram of a device for displaying reference content according to an embodiment of the present disclosure.

FIG. 8 is a schematic structural diagram of a device for displaying reference content according to an embodiment of the present disclosure. The device may be a part of a terminal device, such as a mobile phone, or a computer. The device 20 for displaying reference content according to an embodiment of the present disclosure includes a first display unit 201, a second display unit 202 and an overlay display unit 203.

The first display unit 201 is configured to display a first interface in response to an operation of enabling the first interface performed by a user.

The second display unit 202 is configured to display multiple second interfaces on the first interface displayed by the first display unit 201 in a form of floating window in response to an operation of enabling reference content performed by the user. The multiple second interfaces respectively include different reference contents.

The overlay display unit 203 is configured to display, in response to an operation of selecting by the user a second interface from the multiple second interfaces displayed by the second display unit 202, the selected second interface on the first interface in an overlaying manner.

In the conventional technology, it is necessary to switch between a formation template interface and a formation scene interface to arrange a formation by imitating a template, which results in the low efficiency of arranging a formation and reduces the communication efficiency between a game player and reference content. Compared with the conventional technology, the device for displaying reference content according to the embodiment of the present disclosure can improve the efficiency of arranging a formation and the communication efficiency between a game player and the reference content.

Optionally, in an optional embodiment of the device 20 for displaying reference content according to the embodiment of the present disclosure, on the basis of the above embodiment corresponding to FIG. 8, the overlay display unit 203 may be configured to display the selected second interface on the first interface in a floating manner, if the reference content included in the selected second interface is transparent or translucent. The area of the selected second interface is over a half of the area of the first interface.

In an embodiment of the present disclosure, if the reference content of the second interface is transparent or translucent, the second interface can float on the first interface without influencing the effect of the user viewing the first interface through the second interface. In this manner, the area of the second interface can be enlarged, which is convenient for viewing details.

Optionally, in an optional embodiment of the device 20 for displaying reference content according to the embodiments of the present disclosure, on the basis of the above embodiment corresponding to FIG. 8, the overlay display unit may be configured to display the selected second interface at a preset position on the first interface in an overlaying manner in a preset size.

As shown in FIG. 7, a second interface of the preset size may be displayed at the top right corner of the first interface. In arranging a formation, the second interface may be placed according to the interface arrangement of the first interface. For example, if the top right corner of the first interface is idle, the second interface may be placed at the top right corner of the first interface. In addition, in order to facilitate the finger to comfortably zoom in and out the formation picture, the height of the entire frame may be not smaller than three times of that of a minimum operating area of the finger.

Figure 9:
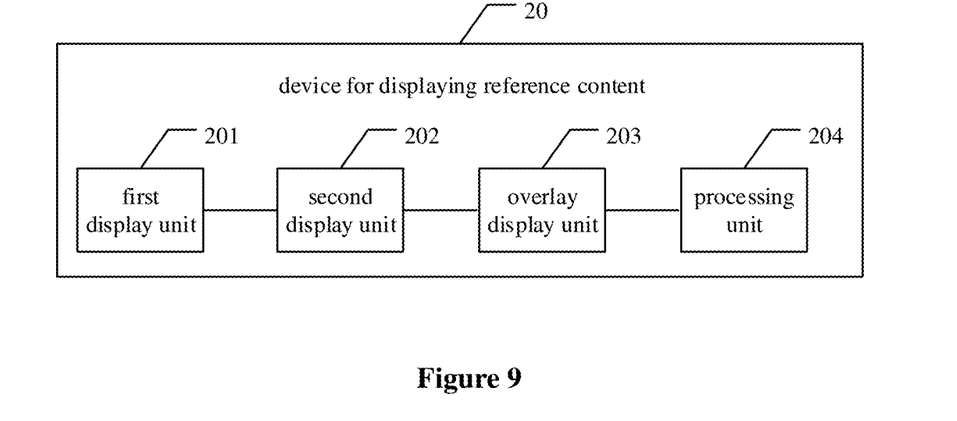
FIG. 9 is a schematic structural diagram of a device for displaying reference content according to another embodiment of the present disclosure.

Optionally, another optional embodiment of the device 20 for displaying reference content according to the embodiment of the present disclosure is provided on the basis of the above embodiment corresponding to FIG. 8. Reference is made to FIG. 9. The device 20 further includes a processing unit 204 configured to, if the selected second interface which is displayed in an overlaying manner by the overlay display unit 203 includes multiple function operation buttons, process, in response to any function operation performed by the user via the function operation button, the selected second interface in a manner corresponding to the function operation.

In an embodiment of the present disclosure, the second interface may include multiple function operation buttons, such as for zooming in, zooming out, or closing. When a user triggers any one of the buttons, the corresponding function will be executed, and the second interface will be zoomed in, or zoomed out, or closed.

Optionally, in an optional embodiment of the device 20 for displaying reference content according to the embodiments of the present disclosure, on the basis of the above embodiment corresponding to FIG. 8, the processing unit 204 is configured to display, in response to an operation of selecting a second interface from the multiple second interfaces performed by the user, a video about the reference content on the selected operation interface, with the video about the reference content includes dynamic descriptive information about the reference content, and display the selected second interface on the first interface in an overlaying manner in response to an operation of affirming the selected operation interface performed by the user.

The embodiments of the present disclosure can be understood with reference to FIG. 6 and FIG. 7.

Figure 10:
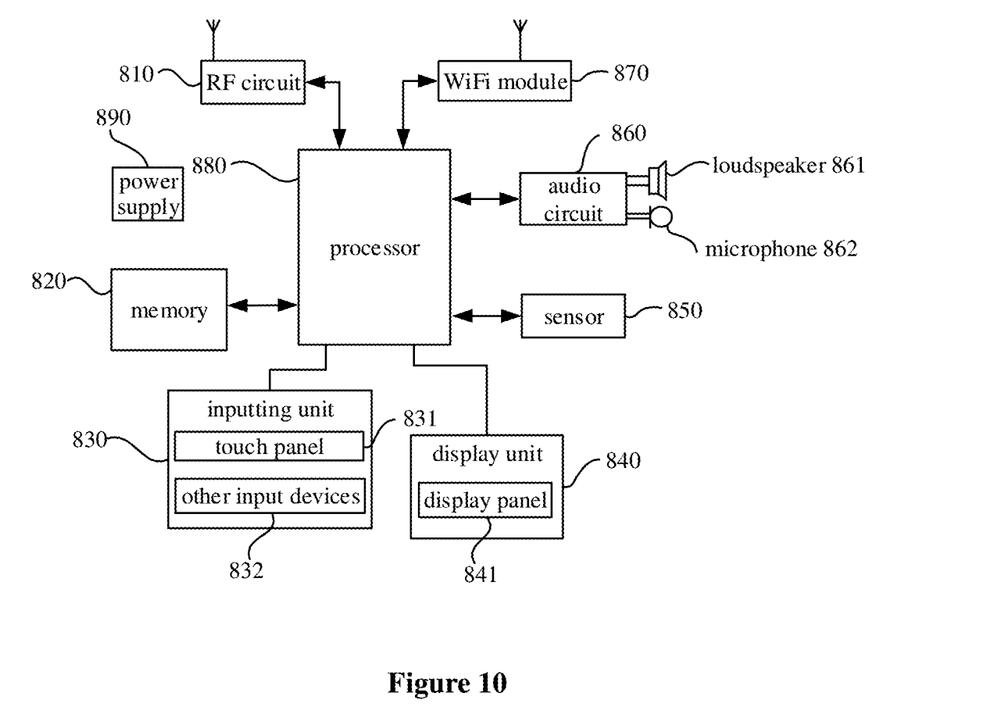
FIG. 10 is a structural diagram of a part of a mobile phone related to a terminal according to the embodiment of the present disclosure.

A device for displaying reference content is further provided according to another embodiment of the present disclosure. The device for displaying reference content may be any device configured to display reference content, such as a terminal, a server, or a robot. Reference is made to FIG. 10 which takes a terminal as an example. For the convenience of description, only the portions related to the embodiment of the present disclosure are shown, and specific technical details are not disclosed, which may refer to the method portion of the embodiment of the present disclosure. The terminal may be any terminal device, such as a mobile phone, a tablet computer, a personal digital assistant (PDA), a point of sales (POS), and an onboard computer. An example is illustrated by taking the terminal being a mobile phone as an example.

FIG. 10 is a structural diagram of a part of a mobile phone related to a terminal according to the embodiment of the present disclosure. Reference is made to FIG. 10. The mobile phone includes a radio frequency (RF) circuit 810, a memory 820, an inputting unit 830, a display unit 840, a sensor 850, an audio circuit 860, a wireless fidelity (WiFi) module 870, a processor 880 and a power supply 890, and so on. It can be understood by those skilled in the art that, the structure of the mobile phone illustrated in FIG. 10 is not limitation to the mobile phone. The technical solution according to the present disclosure may include more or less components as compared with the components illustrated in FIG. 10, or have some components combined, or use a different arrangement of the components.

Hereinafter, various components of the mobile phone will be described in detail with reference to FIG. 10.

The RF circuit 810 may be configured to receive and transmit signals during the process of message communication or calling. Specifically, the RF circuit 810 may be configured to receive downlink information from a base station and transmit the downlink information to the processor 880 for processing. In addition, the RF circuit 810 may be configured to transmit data related to the uplink to the base station. Generally, the RF circuit includes but is not limited to an antenna, at least one amplifier, a transceiver, a coupler, an LNA (Low Noise Amplifier), a duplexer and the like. In addition, the RF circuit 810 may communicate with the network and other devices through wireless communication. The wireless communication may be implemented by any communication standard or protocol, including but not limited to GSM (Global System of Mobile communication), GPRS (General Packet Radio Service), CDMA (Code Division Multiple Access), WCDMA (Wideband Code Division Multiple Access), LTE (Long Term Evolution), e-mail, SMS (Short Messaging Service) and the like.

The memory 820 may be configured to store software programs and modules, which may be executed by the processor 880 to execute various applications as well as data processing. The memory 820 may mainly include a program storage region and a data storage region. In the program storage region, it may be stored operating systems, applications required for at least one function (such as a sound playback function and an image playback function) and the like. In the data storage region, it may be stored data created base on the using of the mobile phone 800 (such as audio data and phone book) and the like. In addition, the memory 820 may include a high-speed random access memory. The memory 820 may further include a non-volatile memory, such as at least one magnetic disk storage device, a flash memory device, or other non-volatile solid state memory device.

The inputting unit 830 may be configured to receive inputted digital or character information, and generate a keyboard signal input related to user settings and function control of the mobile phone 800. Specifically, the inputting unit 830 may include a touch panel 831 and other inputting devices 832. The touch panel 831, also referred to as a touch screen, may collect touch operations on or near it by a user (such as operations on or near the touch panel 831 by a user using a finger, a stylus or other suitable objects or accessories), and drive a corresponding connection device according to a preset program. Optionally, the touch panel 831 may include a touch detection device and a touch controller. The touch detection device detects a touch orientation of a user, and detects signals of the touch operation to transmit the signals to the touch controller. The touch controller receives the touch information from the touch detection device, converts the touch information into coordinates of a touch point, and then transfers the coordinates to the processor 880. The touch controller may further receive and execute commands from the processor 880. In addition, the touch panel 831 may be realized by various touch-sensitive technical types, such as resistive type, capacitive type, infrared light type and surface acoustic wave type. In addition to the touch panel 831, the inputting unit 830 may include other inputting devices 832. Specifically, other inputting devices 832 may include but are not limited to one or more of a physical keyboard, a function key (such as a volume control button and a switch button), a trackball, a mouse, an operating rod and the like.

The display unit 840 may be configured to display information input by a user or information provided to the user or various menus of the mobile phone 800. The display unit 840 may include a display panel 841. Optionally, the display panel 841 may be configured in the form of an LCD (Liquid Crystal Display), an OLED (Organic Light-Emitting Diode) or the like. Further, the touch panel 831 may cover the display panel 841. On detection of a touch operation on or near the touch panel 831, the touch operation is transmitted to the processor 880 to determine the type of the touch event, and then the processor 880 provides a corresponding visual output on the display panel 841 based on the type of the touch event. Although the touch panel 831 and the display panel 841 are shown in FIG. 10 as two separate components for realizing an input and an output function, the touch panel 831 in some embodiments may be integrated with the display panel 841 to realize the input and output function.

The mobile phone 800 may further include at least one sensor 850, such as an optical sensor, a motion sensor and other sensors. Specifically, the light sensor may include an ambient light sensor and a proximity sensor. The ambient light sensor may adjust the brightness of the display panel 841 according to the brightness of the ambient light, and the proximity sensor may close the display panel 841 and/or back light when the mobile phone is moved near the ear. As a motion sensor, the gravity acceleration sensor may detect the magnitude of acceleration in all directions (typically three axis), and may detect the magnitude and direction of gravity at rest. The gravity acceleration sensor may be applied to applications for identifying the gesture of the mobile phone (such as horizontal and vertical screen switching, related games and magnetometer attitude calibration), vibration identification related functions (such as a pedometer and a tap) and the like. The mobile phone may be further include other sensors, such as a gyroscope, a barometer, a hygrometer, a thermometer, an infrared sensor and the like, which are not described herein.

An audio circuit 860, a speaker 861, and a microphone 862 may be configured to provide an audio interface between a user and the mobile phone. The audio circuit 860 may be configured to transfer, to the speaker 861, an electrical signal which is converted from the received audio data, and then the speaker 861 is configured to convert the electrical signal into a sound signal for outputting. The microphone 862 is configured to convert a collected sound signal into the electrical signal which is to be received by the audio circuit 860 and then converted to audio data. The audio data are outputted to and processed by the processor 880, and then for example transmitted, through the RF circuit 810, to another terminal or outputted to the memory 820 for further processing.

WiFi is a short-range wireless transmission technology, which provides users with wireless broadband Internet access. Through the WiFi module 870, the terminal 600 can help users to send and receive e-mail, browse the web, access to streaming media and the like. Although FIG. 10 shows the WiFi module 870, it should be understood that the WiFi module 870 is not a necessary component of the mobile phone 800, and may be omitted without departing from the essence of the disclosure.

The processor 880 is the control center of the terminal 600, and configured to connect various parts of the mobile phone via various interfaces and lines. By operating or executing the software programs and/or modules stored in the memory 820 and calling the data stored in the memory 820, the processor 880 is configured to perform various functions and data processing of the terminal 600, thereby overall monitoring the mobile phone. Optionally, the processor 880 may include one or more processing cores. Preferably, the processor 880 may be integrated with an application processor and a modem processor. The application processor mainly processes an operating system, a user interface, an application and the like, and the modem processor mainly processes wireless communications. It is to be understood that, the above-described modem processor may not be integrated into the processor 880.

The mobile phone 800 also includes the power supply 890 (such as a battery) for supplying power to various components. Preferably, the power supply may be logically connected to the processor 880 through a power management system, so as to manage charging, discharging and power consumption management functions via the power management system.

Although not shown, the mobile phone 800 may also include a camera, a Bluetooth module and so on, which will not be described herein.

In an embodiment of the present disclosure, the processor 880 included in the terminal further has the following functions: displaying, by the display unit 840, a first interface in response to an operation of enabling the first interface performed by a user, displaying, by the display unit 840, multiple second interfaces in a form of floating window on the first interface in response to an operation of enabling reference content performed by the user, with the multiple second interfaces respectively including different reference contents, and displaying, by the display unit 840 in response to an operation of selecting a second interface from the multiple second interfaces performed by the user, the selected second interface on the first interface in an overlaying manner.

In the conventional technology, it is necessary to switch between a formation template interface and a formation scene interface to arrange a formation by imitating a template, which results in the low efficiency of arranging a formation and reduces the communication efficiency between a game player and reference content. Compared with the conventional technology, the method for displaying reference content according to the embodiment of the present disclosure can improve the efficiency of arranging a formation and the communication efficiency between a game player and the reference content.

Optionally, the displaying the selected second interface on the first interface in an overlaying manner includes displaying the selected second interface on the first interface in a floating manner, if the reference content included in the selected second interface is transparent or translucent, where the area of the selected second interface is over a half of the area of the first interface.

In an embodiment of the present disclosure, if the reference content of the second interface is transparent or translucent, the second interface can float on the first interface without influencing the effect of the user viewing the first interface through the second interface. In this manner, the area of the second interface can be enlarged, which is convenient for viewing details.

Optionally, the displaying the selected second interface on the first interface in an overlaying manner includes displaying the selected second interface at a preset position on the first interface in an overlaying manner in a preset size.

As shown in FIG. 7, a second interface of a preset size may be displayed at the top right corner of the first interface. In arranging a formation, the second interface may be arranged according to the interface arrangement of the first interface. For example, if the top right corner of the first interface is idle, the second interface may be placed at the top right corner of the first interface. In addition, in order to facilitate the finger to comfortably zoom in and out the formation picture, the height of the entire frame may be not smaller than three times of that of a minimum operating area of the finger.

Optionally, the processor 880 may be further configured to, if the selected second interface includes multiple function operation buttons, processing, in response to any function operation performed via the function operation button, the selected second interface in a manner corresponding to the function operation.

In an embodiment of the present disclosure, the second interface may include multiple function operation buttons, such as for zooming in, zooming out, or closing. When a user triggers any one of the buttons, the corresponding function will be executed, and the second interface will be zoomed in, or zoomed out, or closed.

Optionally, the displaying, in response to an operation of selecting a second interface from the multiple second interfaces performed by the user, the selected second interface on the first interface in an overlaying manner may include displaying, in response to an operation of selecting a second interface from the multiple second interfaces performed by the user, a video about the reference content on the selected operation interface, with the video about the reference content including dynamic descriptive information about the reference content, and displaying the selected second interface on the first interface in an overlaying manner in response to an operation of affirming the selected operation interface performed by the user.

The embodiments of the present disclosure can be understood with reference to FIG. 6 and FIG. 7.

It may be understood by those skilled in the art, all or part of steps implementing the above-described embodiments may be completed by hardware instructed by relevant program instructions, which can be stored in a computer readable storage medium. The storage medium may be a ROM, a RAM, a disk, or a CD, etc.

In the above, a method and a device for displaying reference content and a storage medium according to the embodiments of the present disclosure are described in detail. The principles and the embodiments of the present disclosure are set forth with specific examples. The description of the above embodiments is only for illustrative purposes. Meanwhile, the specific embodiments and the applying scope can be changed by those skilled in the art in basis of the ideas of the present disclosure. According to the above, the content in the specification should not be construed as being limited to the present disclosure.

The invention claimed is:

1. A method for displaying reference content, comprising:
in a device for displaying reference content comprising a processor:
    displaying a first interface in response to an operation of enabling the first interface;
    displaying a plurality of second interfaces on the first interface in a form of floating window in response to an operation of enabling reference content, with the plurality of second interfaces respectively comprising different reference content;
    displaying, in response to an operation of selecting a second interface from the plurality of second interfaces, the selected second interface on the first interface in an overlaying manner, at least a portion of content from the first interface being visible in an area defined by the selected second interface, the area including the reference content of the selected second interface, the reference content being translucent; and
    zooming, in response to a zoom operation, the area defined by the selected second interface such that the portion of content from the first interface and the reference content become larger in the selected second interface.

2. The method according to claim 1, wherein displaying the selected second interface on the first interface in an overlaying manner comprises:
    displaying the selected second interface on the first interface in a floating manner, wherein the area of the selected second interface is over at least half of an area of the first interface.

3. The method according to claim 1, wherein displaying the selected second interface on the first interface in an overlaying manner comprises:
    displaying the selected second interface at a preset position and at a preset size.

4. The method according to claim 2,
    wherein the selected second interface comprises a plurality of function operation buttons, the method further comprising:
    processing, in response to detection of a function operation corresponding to the function operation button, the selected second interface in a manner corresponding to the function operation.

5. The method according to claim 3, wherein the selected second interface comprises a plurality of function operation buttons, the method further comprising:
    processing, in response to any function operation performed via the function operation button, the selected second interface in a manner corresponding to the function operation.

6. The method according to claim 1, wherein displaying, in response to the operation of selecting the second interface from the plurality of second interfaces, the selected second interface on the first interface in the overlaying manner further comprises:
    displaying, in response to an operation of selecting the second interface from the plurality of second interfaces, a video about the reference content on the selected interface, wherein the video about the reference content comprises dynamic descriptive information about the reference content; and
    displaying the selected second interface on the first interface in the overlaying manner in response to an operation of affirming the selected operation interface.

7. The method according to claim 2, wherein displaying, in response to an operation of selecting the second interface from the plurality of second interfaces, the selected second interface on the first interface in an overlaying manner comprises:
    displaying, in response to the operation of selecting the second interface from the plurality of second interfaces, a video about the reference content on the selected operation interface, wherein the video about the reference content comprises dynamic descriptive information about the reference content; and
    displaying the selected second interface on the first interface in the overlaying manner in response to an operation of affirming the selected operation interface.

8. The method according to claim 3, wherein displaying, in response to an operation of selecting the second interface from the plurality of second interfaces, the selected second interface on the first interface in the overlaying manner comprises:
    displaying, in response to an operation of selecting the second interface from the plurality of second interfaces, a video about the reference content on the selected operation interface, wherein the video about the reference content comprises dynamic descriptive information about the reference content; and
    displaying the selected second interface on the first interface in the overlaying manner in response to an operation of affirming the selected operation interface.

9. A device for displaying reference content, the device comprising:
a hardware processor and a storage medium accessible by the hardware processor, the hardware processor configured to:
display a first interface in response to an operation of enabling the first interface;
display a plurality of second interfaces on the first interface in a form of floating window in response to an operation of enabling reference content, with the plurality of second interfaces respectively comprising different reference content;
display, in response to an operation of selecting a second interface from the plurality of second interfaces, the selected second interface on the first interface in an overlaying manner, at least a portion of content from the first interface being visible in an area defined by the selected second interface, the area including the reference content of the selected second interface, the reference content being translucent; and
zoom, in response to a zoom operation, the area defined by the selected second interface such that the portion of content from the first interface and the reference content become larger in the selected second interface.

10. The device according to claim 9, wherein displaying to display the selected second interface on the first interface in an overlaying manner the hardware processor is further configured to:
display the selected second interface on the first interface in a floating manner, wherein the area of the selected second interface is over at least half of an area of the first interface.

11. The device according to claim 9, wherein to display the selected second interface on the first interface in an overlaying the hardware processor is further configured to:
display the selected second interface at a preset position and at a preset size.

12. The device according to claim 10, wherein the selected second interface comprises a plurality of function operation buttons, wherein the hardware processor is further configured to:
process, in response to detection of a function operation corresponding to the function operation button, the selected second interface in a manner corresponding to the function operation.

13. The device according to claim 11, wherein the selected second interface comprises a plurality of function operation buttons, wherein the hardware processor is further configured to:
process, in response to any function operation performed via the function operation button, the selected second interface in a manner corresponding to the function operation.

14. The device according to claim 9, wherein to display, in response to the operation of selecting the second interface from the plurality of second interfaces, the selected second interface on the first interface in the overlaying manner, the hardware processor is further configured to:
display, in response to an operation of selecting the second interface from the plurality of second interfaces, a video about the reference content on the selected interface, wherein the video about the reference content comprises dynamic descriptive information about the reference content; and
display the selected second interface on the first interface in the overlaying manner in response to an operation of affirming the selected operation interface.

15. The device according to claim 10, wherein to display, in response to an operation of selecting the second interface from the plurality of second interfaces, the selected second interface on the first interface in the overlaying manner, the hardware processor is further configured to:
display, in response to the operation of selecting the second interface from the plurality of second interfaces, a video about the reference content on the selected operation interface, wherein the video about the reference content comprises dynamic descriptive information about the reference content; and
display the selected second interface on the first interface in the overlaying manner in response to an operation of affirming the selected operation interface.

16. The device according to claim 11, wherein to display, in response to the operation of selecting the second interface from the plurality of second interfaces, the selected second interface on the first interface in the overlaying manner, the hardware processor is further configured to:
display, in response to an operation of selecting the second interface from the plurality of second interfaces, a video about the reference content on the selected operation interface, wherein the video about the reference content comprises dynamic descriptive information about the reference content; and
display the selected second interface on the first interface in the overlaying manner in response to an operation of affirming the selected operation interface.

17. A non-transitory computer readable storage medium, having computer executable instructions stored therein, the computer executable instructions accessible by a processor, the computer executable instructions configured to cause the processor to:
display a first interface in response to an operation of enabling the first interface;
display a plurality of second interfaces on the first interface in a form of floating window in response to an operation of enabling reference content, with the plurality of second interfaces respectively comprising different reference content;
display, in response to an operation of selecting a second interface from the plurality of second interfaces, the selected second interface on the first interface in an overlaying manner, at least a portion of the content from the first interface being visible in an area defined by the selected second interface, the area including the reference content of the selected second interface the reference content being translucent; and
zoom, in response to a zoom operation, the area defined by the selected second interface such that the portion of content from the first interface and the reference content become larger in the selected second interface.

18. The non-transitory computer readable storage medium according to claim 17, wherein the computer executable instructions are further configured to cause the processor to:
display the selected second interface on the first interface in a floating manner, wherein the area of the selected second interface is over at least half of an area of the first interface.

19. The non-transitory computer readable storage medium according to claim 17, wherein the computer executable instructions are further configured to cause the processor to:
display the selected second interface at a preset position on the first interface and in a preset size.

20. The non-transitory computer readable storage medium according to claim 17, wherein the computer executable instructions are further configured to cause the processor to:
- display, in response to an operation of selecting the second interface from the plurality of second interfaces, a video about the reference content on the selected interface, wherein the video about the reference content comprises dynamic descriptive information about the reference content; and
- display the selected second interface on the first interface in the overlaying manner in response to an operation of affirming the selected operation interface.

* * * * *

UNITED STATES PATENT AND TRADEMARK OFFICE
CERTIFICATE OF CORRECTION

PATENT NO. : 10,698,579 B2
APPLICATION NO. : 15/673023
DATED : June 30, 2020
INVENTOR(S) : Kunjie Zhang et al.

Page 1 of 1

It is certified that error appears in the above-identified patent and that said Letters Patent is hereby corrected as shown below:

In the Claims

Column 13, Claim 10, Line 27, delete "displaying"

Signed and Sealed this
Sixth Day of October, 2020

Andrei Iancu
*Director of the United States Patent and Trademark Office*